United States Patent
Mao et al.

(10) Patent No.: US 11,177,696 B2
(45) Date of Patent: Nov. 16, 2021

(54) RECEIVE END AND TRANSMIT END OF WIRELESS CHARGING SYSTEM, AND WIRELESS CHARGING SYSTEM

(71) Applicant: Huawei Technologies Co., Ltd., Shenzhen (CN)

(72) Inventors: Yunhe Mao, Shenzhen (CN); Zhixian Wu, Dongguan (CN); Xiaosheng Zeng, Shenzhen (CN)

(73) Assignee: HUAWEI TECHNOLOGIES CO., LTD., Shenzhen (CN)

(\*) Notice: Subject to any disclaimer, the term of this patent is extended or adjusted under 35 U.S.C. 154(b) by 0 days.

(21) Appl. No.: 17/136,894

(22) Filed: Dec. 29, 2020

(65) Prior Publication Data

US 2021/0126491 A1 Apr. 29, 2021

Related U.S. Application Data

(63) Continuation of application No. PCT/CN2019/107427, filed on Sep. 24, 2019.

(30) Foreign Application Priority Data

Dec. 27, 2018 (CN) .......................... 201811612206.4

(51) Int. Cl.
*H02J 50/12* (2016.01)
*H02J 50/80* (2016.01)
*H02J 50/10* (2016.01)

(52) U.S. Cl.
CPC .............. *H02J 50/12* (2016.02); *H02J 50/10* (2016.02); *H02J 50/80* (2016.02)

(58) Field of Classification Search
CPC ...................................................... H02J 7/025
USPC ........................................................ 320/108
See application file for complete search history.

(56) References Cited

U.S. PATENT DOCUMENTS

| | | | |
|---|---|---|---|
| 2015/0015197 A1 | 1/2015 | Mi et al. | |
| 2016/0056639 A1 | 2/2016 | Mao | |
| 2017/0005525 A1* | 1/2017 | Lecias, Jr. | ............... H02J 50/80 |
| 2017/0025897 A1 | 1/2017 | Menegoli | |

(Continued)

FOREIGN PATENT DOCUMENTS

| | | |
|---|---|---|
| CN | 102222967 A | 10/2011 |
| CN | 106394270 A | 2/2017 |

(Continued)

*Primary Examiner* — Edward Tso
*Assistant Examiner* — Ahmed H Omar
(74) *Attorney, Agent, or Firm* — Conley Rose, P.C.

(57) ABSTRACT

A receive end and a transmit end of a wireless charging system, and the wireless charging system, where the receive end includes a receive coil, a rectifier, and a receive end controller, where the receive coil receives an alternating magnetic field and outputs an alternating current, the rectifier is configured to rectify the alternating current from the receive coil into a direct current, the receive end controller is configured to adjust, based on a target impedance sent by a transmit end controller, a reflection impedance reflected from the receive end to a transmit end such that an inverter of the transmit end implements a zero voltage switching (ZVS), and a bridge arm voltage is a voltage between two bridge arm midpoints of a full bridge rectifier or a voltage between a single bridge arm midpoint of a half bridge rectifier and ground.

20 Claims, 9 Drawing Sheets

(56) References Cited

U.S. PATENT DOCUMENTS

| | | | |
|---|---|---|---|
| 2017/0028853 A1 | 2/2017 | Elshaer et al. | |
| 2017/0256956 A1* | 9/2017 | Irish | H02J 5/00 |
| 2017/0317529 A1* | 11/2017 | Smith | H02J 50/10 |
| 2019/0283615 A1* | 9/2019 | Lee | H02M 7/219 |
| 2021/0226473 A1 | 7/2021 | Mao et al. | |

FOREIGN PATENT DOCUMENTS

| | | |
|---|---|---|
| CN | 106452080 A | 2/2017 |
| CN | 107005091 A | 8/2017 |
| CN | 206595897 U | 10/2017 |
| CN | 108656994 A | 10/2018 |
| CN | 109510501 A | 3/2019 |
| CN | 109672343 A | 4/2019 |
| CN | 109742863 A | 5/2019 |
| EP | 3843239 A1 | 6/2021 |
| WO | 2017136491 A1 | 8/2017 |
| WO | 2020087360 A1 | 5/2020 |

\* cited by examiner

RECEIVE END AND TRANSMIT END OF WIRELESS CHARGING SYSTEM, AND WIRELESS CHARGING SYSTEM

CROSS-REFERENCE TO RELATED APPLICATIONS

This application is a continuation of International Patent Application No. PCT/CN2019/107427 filed on Sep. 24, 2019, which claims priority to Chinese Patent Application No. 201811612206.4 filed on Dec. 27, 2018. The disclosures of the aforementioned applications are hereby incorporated by reference in their entireties.

TECHNICAL FIELD

The present disclosure relates to the field of power electronics technologies, and in particular, to a receive end and a transmit end of a wireless charging system, and a wireless charging system.

BACKGROUND

With aggravation of energy shortage and environmental pollution problems of modern society, as a new energy vehicle, an electric vehicle attracts wide attention once launched. However, most of existing electric vehicles are limited by a battery capacity, and can run for a relatively short distance. In addition, a long battery charging time and shortage of corresponding charging station resources of electric vehicles become biggest bottlenecks that impede application and popularization of electric vehicles.

Methods for charging a battery of an electric vehicle usually include contact charging and wireless charging. The contact charging means electricity conduction through metallic contact between a plug and a socket, and the wireless charging means transferring electric energy using a coupled alternating magnetic field as a medium. Compared with the contact charging, the wireless charging has many advantages and has become a main manner of charging the electric vehicle in the future.

An operation principle of a wireless charging system is described below with reference to an accompanying drawing.

Figure 1:
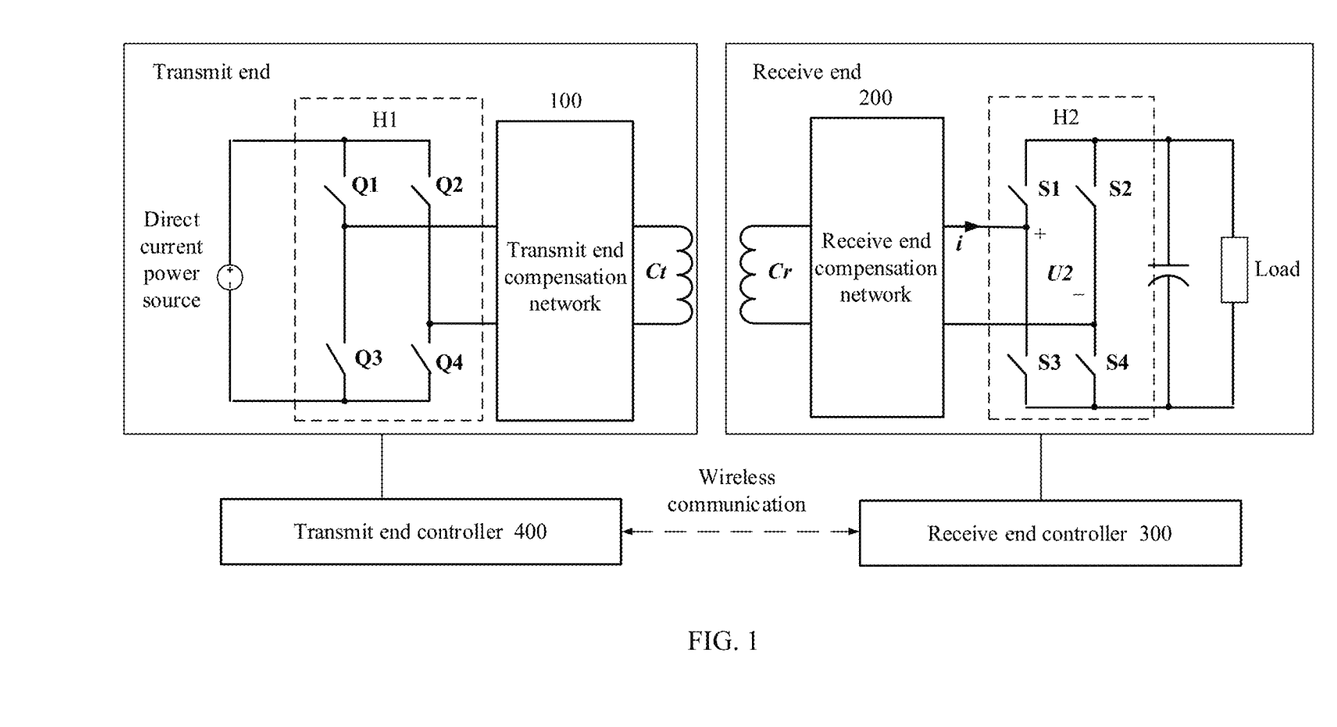
FIG. 1 is a schematic diagram of a wireless charging system.

FIG. 1 is a schematic diagram of a wireless charging system.

The wireless charging system includes a transmit end and a receive end. The transmit end includes an inverter H1, a transmit end compensation network 100, a transmit end controller 400, and a transmit coil Ct. The receive end includes a rectifier H2, a receive end compensation network 200, and a receive end controller 300.

Because the H1 is connected to a direct current power source, the H1 is configured to invert a direct current into an alternating current. The transmit end compensation network 100 compensates an alternating current output by the H1 and then outputs the compensated alternating current to the transmit coil Ct, and the transmit coil Ct is configured to transmit the alternating current in a form of an alternating magnetic field.

A receive coil Cr of the receive end is configured to receive an alternating magnetic field and output an alternating current, the receive end compensation network 200 is configured to compensate the alternating current and then output the compensated alternating current to the rectifier H2, and the H2 is configured to rectify the alternating current into a direct current and supply the direct current to a load.

The H1 includes four controllable switching transistors Q1 to Q4 and the H2 includes four controllable switching transistors S1 to S4.

Because the controllable switching transistor generates a loss in a switching process, it is desirable that the controllable switching transistor generates a loss as less as possible in the switching process, to improve operation efficiency of the wireless charging system.

SUMMARY

To resolve the foregoing technical problems, the present disclosure provides a receive end and a transmit end of a wireless charging system, and a wireless charging system, which can ensure that an inverter of the transmit end implements zero voltage switching (ZVS), and reduce a loss generated by a controllable switching transistor, thereby improving operation efficiency of the wireless charging system.

According to a first aspect, an embodiment of this application provides a receive end of a wireless charging system, including a receive coil, a rectifier, and a receive end controller, where the receive coil receives an alternating magnetic field and outputs an alternating current, the rectifier rectifies the alternating current from the receive coil into a direct current, the receive end controller adjusts, based on a target impedance sent by a transmit end controller, a reflection impedance reflected from the receive end to a transmit end such that an inverter of the transmit end implements ZVS, and the rectifier may be a full bridge rectifier or may be a half bridge rectifier, when the rectifier is a full bridge rectifier, a bridge arm voltage is a voltage between two bridge arm midpoints of a full bridge rectifier, and when the rectifier is a half bridge rectifier, a bridge arm voltage is a voltage between a single bridge arm midpoint of the half bridge rectifier and ground.

The receive end adjusts the reflection impedance reflected from the receive end to the transmit end, to further adjust an equivalent output impedance of the inverter of the transmit end such that a controllable switching transistor of the inverter implements ZVS, and the receive end adjusts the reflection impedance based on the target impedance sent from the transmit end, that is, a reflection impedance required by the transmit end is used as the target impedance such that the receive end adjusts an actual reflection impedance of the receive end based on the target impedance to meet a requirement of the transmit end. When the equivalent output impedance of the inverter exhibits a resistance inductivity, the controllable switching transistor of the inverter may be enabled to implement ZVS.

The receive end controller is further configured to obtain a corresponding target input impedance of the rectifier based on the target impedance, and obtain an equivalent input impedance of the rectifier, compare the target input impedance of the rectifier with the equivalent input impedance, and adjust a phase difference between an input current and a bridge arm voltage of the rectifier based on a comparison result so that the reflection impedance is consistent with the target impedance.

The phase difference between the input current and the bridge arm voltage of the rectifier is adjusted so that the reflection impedance of the receive end is consistent with the target impedance.

The equivalent input impedance of the rectifier may be obtained based on the input current and the bridge arm voltage of the rectifier, that is, the bridge arm voltage divided by the input current is the equivalent input impedance.

The receive end controller is further configured to compare the equivalent input impedance of the rectifier with the target input impedance, decrease the phase difference between the input current and the bridge arm voltage of the rectifier when the equivalent input impedance of the rectifier exhibits a capacitivity greater than that of the target input impedance, and increase the phase difference between the input current and the bridge arm voltage of the rectifier when the equivalent input impedance of the rectifier exhibits a capacitivity less than or equal to that of the target input impedance.

That the equivalent input impedance of the rectifier exhibits a capacitivity greater than that of the target impedance includes an imaginary part of the equivalent input impedance of the rectifier is a negative value, an imaginary part of the target impedance is a negative value, and an absolute value of the imaginary part of the equivalent input impedance of the rectifier is greater than an absolute value of the imaginary part of the target impedance.

The receive end further includes a receive end inductor-capacitor-capacitor (LCC) compensation network, where the receive end LCC compensation network is connected between the receive coil and the rectifier, and is configured to compensate the alternating current output by the receive coil and then send the compensated alternating current to the rectifier.

The LCC compensation network includes three branches, one inductive branch and two capacitive branches, and the three branches exhibit equal impedance modulus values. Usually, architectures of compensation networks of the receive end and the transmit end are the same, that is, both LCC compensation networks.

The receive end controller is further configured to obtain the target input impedance of the rectifier based on the target impedance, a modulus value of an impedance of each branch in the receive end LCC compensation network, and a mutual inductance between a transmit coil and the receive coil.

According to a second aspect, an embodiment of this application further provides a transmit end of a wireless charging system, including a transmit coil, an inverter, and a transmit end controller, where the inverter inverts a direct current output by a direct current power source into an alternating current, the transmit coil transmits the alternating current in a form of an alternating magnetic field, and the transmit end controller obtains a target impedance based on an input voltage of the inverter, a phase difference between two bridge arms of the inverter, and a power that the wireless charging system needs to output, and sends the target impedance to a receive end controller such that the receive end controller controls a reflection impedance of a receive end to be consistent with the target impedance.

The transmit end may obtain a reflection impedance required by the transmit end, and send the reflection impedance as the target impedance to the receive end controller, and when the reflection impedance reflected by the receive end is used to enable an equivalent output impedance of the inverter of the transmit end to exhibit a resistance inductivity, a controllable switching transistor of the inverter may be enabled to implement ZVS.

The transmit end controller is further configured to obtain the reflection impedance of the receive end based on an output voltage and an output current of the transmit end, compare the reflection impedance of the receive end with the target impedance, and if the reflection impedance of the receive end is consistent with the target impedance, send, to the receive end controller, a message to end adjustment of a phase difference between an input current and a bridge arm voltage of a rectifier.

According to a third aspect, an embodiment of this application further provides a wireless charging system, including a power battery string, the receive end described above, and the transmit end described above, where the receive end charges the power battery string.

Compared with other approaches, the present disclosure has at least the following advantages.

The receive end adjusts the reflection impedance reflected from the receive end to the transmit end, to further adjust the equivalent output impedance of the inverter of the transmit end such that the controllable switching transistor of the inverter implements ZVS, and the receive end adjusts the reflection impedance based on the target impedance sent from the transmit end, that is, a reflection impedance required by the transmit end is used as the target impedance such that the receive end adjusts the actual reflection impedance of the receive end based on the target impedance to meet the requirement of the transmit end. When the equivalent output impedance of the inverter exhibits a resistance inductivity, the controllable switching transistor of the inverter may be enabled to implement ZVS. When the controllable switching transistor of the inverter implements ZVS, power consumption generated in an operation process of the controllable switching transistor may be reduced, thereby improving operation efficiency of the wireless charging system.

BRIEF DESCRIPTION OF DRAWINGS

To describe the technical solutions in some of the embodiments of this application more clearly, the following briefly describes the accompanying drawings describing some of the embodiments. The accompanying drawings in the following description show some embodiments of this application, and a person of ordinary skill in the art may still derive other drawings from these accompanying drawings without creative efforts.

DESCRIPTION OF EMBODIMENTS

To enable a person skilled in the art to better understand the technical solutions provided in the embodiments of this application, an application scenario is first described below. A receive end provided in the embodiments of this application is applied to a wireless charging system. Further, referring to FIG. 1, FIG. 1 is a schematic diagram of a wireless charging system.

The wireless charging system may wirelessly charge an electric terminal, that is, a transmit end and a receive end are not connected through a wire, but wirelessly transfer electromagnetic energy through alternating magnetic field interaction.

In actual application, the transmit end of the wireless charging system usually includes an inverter H1, a transmit end compensation circuit 100, and a transmit coil Ct. The H1 in FIG. 1 includes four controllable switching transistors that are Q1 to Q4, respectively. A function of the inverter H1 is to invert a direct current output by a direct current power source into an alternating current, a function of the transmit end compensation circuit 100 is to compensate the alternating current and then output the compensated alternating current to the transmit coil Ct, a function of the transmit coil Ct is to transmit the alternating current in a form of an alternating magnetic field so that a receive coil Cr wirelessly receives the alternating magnetic field.

The receive end includes the receive coil Cr, a receive end compensation network 200, and a rectifier H2. The receive coil Cr is configured to receive an alternating magnetic field from the transmit coil Ct and output an alternating current. The receive end compensation network 200 is configured to compensate the alternating current and output the compensated alternating current to the rectifier H2. The rectifier H2 includes controllable switching transistors S1 to S4. A receive end controller 300 communicates wirelessly with a transmit end controller 400.

It may be understood that the rectifier H2 may be a full bridge rectifier or may be a half bridge rectifier. When the rectifier is a full bridge rectifier, the four switching transistors may all be controllable switching transistors, or may include two controllable switching transistors and two uncontrollable diodes.

The transmit end controller 400 communicates wirelessly with the receive end controller 300. Manners of wireless communication may include but are not limited to any one or any combination of the following manners. BLUETOOTH, WI-FI, ZIGBEE, a radio frequency identification (RFID) technology, Long Range (LoRa) wireless technology, and a Near-Field-Communication (NFC) technology.

For the inverter of the transmit end of the wireless charging system, to ensure that a controllable switching transistor of the inverter implements a ZVS effect, an equivalent output impedance of the inverter is required to exhibit a specific resistance inductivity when the inverter implements ZVS, that is, the inverter can output a specific ZVS reactive power, and a value of the inductivity needs to be suitable. The ZVS means that a value of a voltage across both ends of a controllable switching transistor is ideally 0 when the controllable switching transistor is turned off and turned on. Certainly, in actual application, the voltage across both ends of the controllable switching transistor may be a relatively small voltage, and a smaller voltage leads to lower power consumption. A lack of an inductivity may cause the inverter to lose the ZVS effect, cause an increase in switching losses, or even cause damage to the inverter. If the inductivity is high, the reactive power output by the inverter is relatively large, which causes a turn-on loss of the inverter to increase and efficiency to decrease. Therefore, the inverter of the transmit end is enabled to implement ZVS, thereby achieving efficiency optimization of the wireless charging system.

According to the technical solutions provided in the embodiments of this application, a reflection impedance reflected from the receive end to the transmit end is adjusted such that a controllable switching transistor of the inverter of the transmit end implements ZVS.

To make a person skilled in the art understand the technical solutions in the present disclosure better, the following clearly describes the technical solutions in the embodiments of the present disclosure with reference to the accompanying drawings in the embodiments of the present disclosure.

Figure 2:
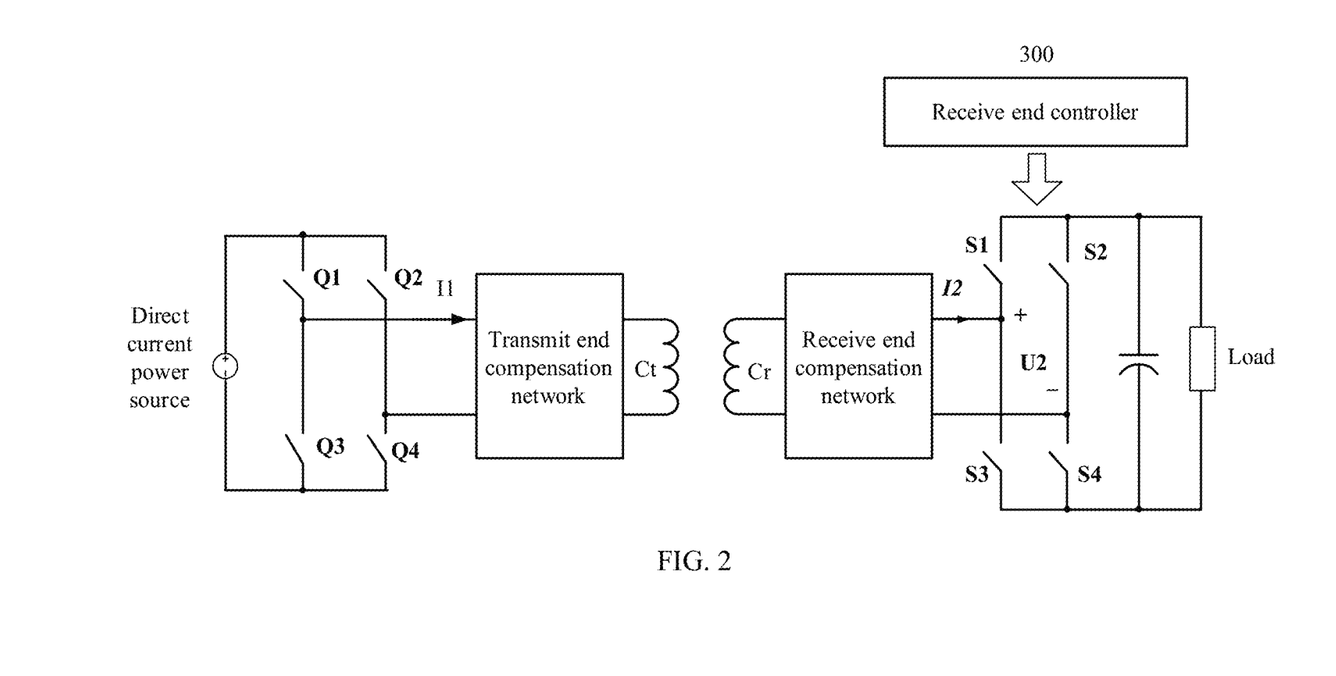
FIG. 2 is a schematic diagram of a receive end of a wireless charging system according to an embodiment of this application.

First Embodiment of a Receive End:

FIG. 2 is a schematic diagram of a receive end of a wireless charging system according to an embodiment of this application.

The receive end of the wireless charging system provided in this embodiment includes a receive coil Cr, a rectifier, and a receive end controller 300.

The receive coil receives an alternating magnetic field and outputs an alternating current.

The rectifier rectifies the alternating current from the receive coil into a direct current.

The rectifier may be a full bridge rectifier or may be a half bridge rectifier. When the rectifier is a full bridge rectifier, four switching transistors may all be controllable switching transistors, such as controllable switching transistors S1 to S4 shown in FIG. 2, or may include two controllable switching transistors and two uncontrollable diodes.

The receive end controller 300 adjusts, based on a target impedance sent by a transmit end controller, a reflection impedance reflected from the receive end to the transmit end such that an inverter of the transmit end implements ZVS, when the rectifier is a full bridge rectifier, the bridge arm voltage is a voltage between two bridge arm midpoints of the full bridge rectifier. As shown in FIG. 2, the S1 and the S3 form a first bridge arm, the S2 and the S4 form a second bridge arm, a first bridge arm midpoint means a common end of the S1 and the S3, and a second bridge arm midpoint means a common end of the S2 and the S4. When the rectifier is a half bridge rectifier, the bridge arm voltage is a voltage between a single bridge arm midpoint of the half bridge rectifier and ground.

It may be understood that the transmit end and the receive end are each provided with a wireless communications module, and the transmit end controller and the receive end controller 300 communicate with each other through their respective wireless communications modules. For example, the transmit end controller sends the target impedance to the wireless communications module of the receive end through the wireless communications module of the transmit end, and then the wireless communications module of the receive end sends the received target impedance to the receive end controller 300.

As shown in FIG. 2, the inverter of the transmit end includes four controllable switching transistors Q1 to Q4.

Because the inverter of the transmit end includes the controllable switching transistors, it is required to enable the controllable switching transistors to implement ZVS, thereby reducing power consumption generated by the controllable switching transistors in an action process.

In this embodiment of this application, the reflection impedance reflected from the receive end to the transmit end is adjusted, to further adjust an equivalent output impedance of the inverter of the transmit end such that a controllable switching transistor of the inverter is controlled to implement ZVS, and the receive end adjusts the reflection impedance based on the target impedance sent from the transmit end, that is, a reflection impedance required by the transmit end is used as the target impedance such that the receive end adjusts a reflection impedance of the receive end so that the reflection impedance meets a requirement of the transmit end. When the equivalent output impedance of the inverter exhibits a resistance inductivity, the controllable switching transistor of the inverter may be enabled to implement ZVS.

The reflection impedance of the receive end is mainly adjusted by adjusting a phase difference between a bridge arm voltage and an input current of the rectifier. Further, referring to FIG. 3, FIG. 3 is a waveform diagram of the bridge arm voltage and the input current of the rectifier.

Figure 3:
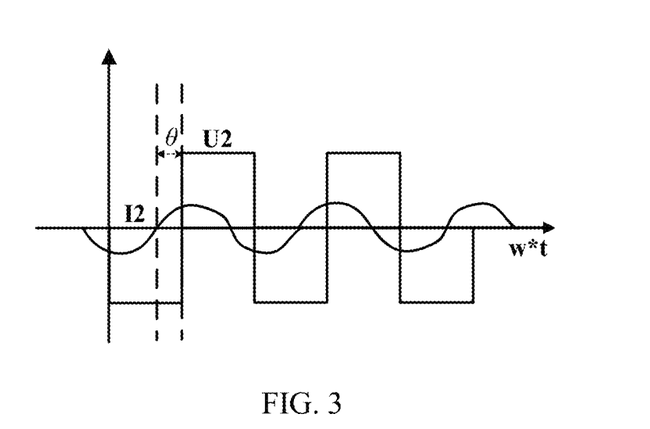
FIG. 3 is a waveform diagram of a bridge arm voltage and an input current of a rectifier according to an embodiment of this application.

In FIG. 3, U2 is the bridge arm voltage of the rectifier, and I2 is the input current of the rectifier.

It may be learned from the figure that, a phase of the bridge arm voltage U2 lags behind a phase of the input current I2, where an angle of the lag is θ, that is, the phase difference between the bridge arm voltage and the input current of the rectifier is θ. The phase difference θ may be adjusted according to a need. When the phase of U2 lags behind that of I2, an equivalent input impedance of the rectifier may be enabled to exhibit a resistance capacitivity.

The receive end provided in this embodiment further includes a receive end LCC compensation network, where the receive end LCC compensation network is connected between the receive coil and the rectifier, and is configured to compensate the alternating current output by the receive coil and then send the compensated alternating current to the rectifier.

It should be noted that the technical solution provided in this embodiment of this application is described using an example in which compensation networks applied to both the transmit end and the receive end are of an LCC structure. It may be understood that the compensation networks of the transmit end and the receive end may be of an LC structure, or may be of a single C structure, or the like in addition to the LCC structure, and details are not described herein.

Figure 4:
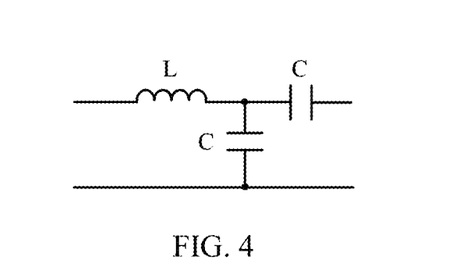
FIG. 4 is a schematic diagram of a compensation network that is of an LCC structure according to an embodiment of this application.

Further, referring to FIG. 4, FIG. 4 is a schematic diagram of a compensation network that is of an LCC structure.

It may be learned from the figure that, LCC includes one inductor L and two capacitors C.

Figure 5:
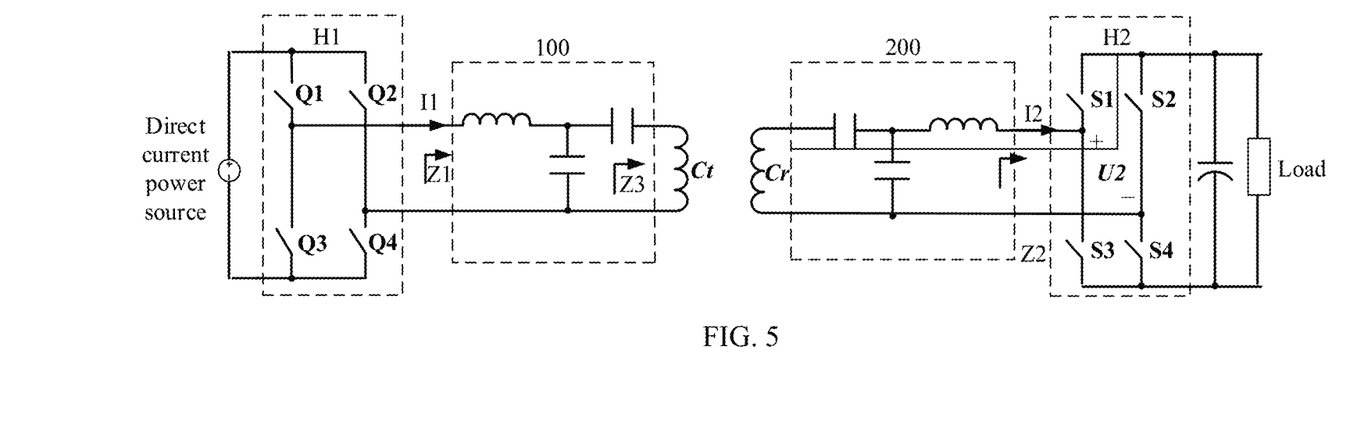
FIG. 5 is a schematic diagram of a transmit end and a receive end that are both LCC compensation networks according to an embodiment of this application.

For a wireless charging system in which the compensation networks of the transmit end and the receive end are both of an LCC structure, further, referring to FIG. 5, FIG. 5 is a schematic diagram of a transmit end and a receive end that are both LCC compensation networks according to an embodiment of this application. It may be learned from FIG. 5 that, the transmit end includes LCC and the receive end also includes LCC.

Second Embodiment of a Receive End

Figure 6:
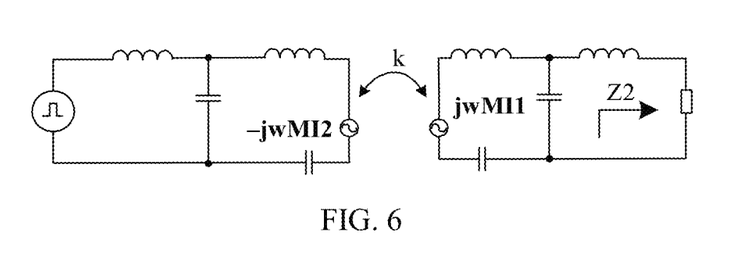
FIG. 6 is an equivalent schematic diagram of a compensation network that is an LCC wireless charging system according to an embodiment of this application.

FIG. 6 is an equivalent schematic diagram of a compensation network that is an LCC wireless charging system according to an embodiment of this application.

An inverter of a transmit end is equivalent to an alternating voltage source, and a rectifier of a receive end is equivalent to a variable load Z2. For example, compensation networks of the transmit end and the receive end are both LCC, and an equivalent circuit may be obtained as shown in FIG. 6.

A receive end controller adjusts an equivalent input impedance of a rectifier to further adjust a reflection impedance, and an operation principle thereof is described in detail below with reference to a flowchart.

Figure 7:
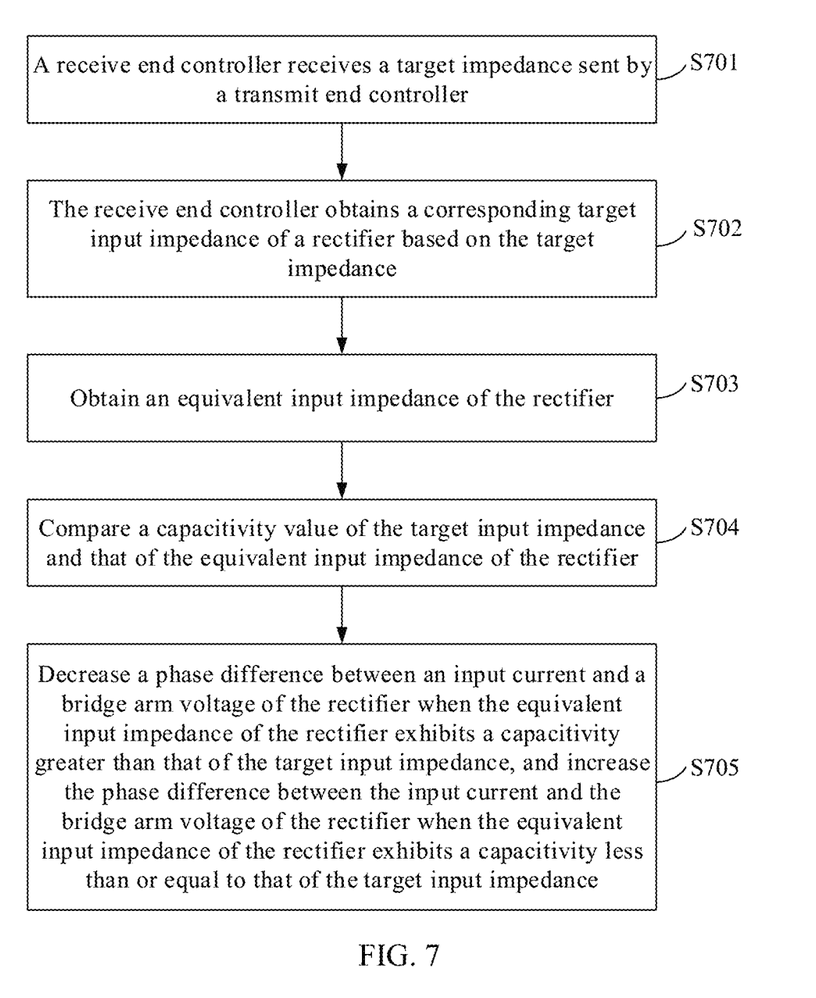
FIG. 7 is a flowchart of adjusting a reflection impedance by a receive end controller according to an embodiment of this application.

FIG. 7 is a flowchart of adjusting a reflection impedance by a receive end controller according to an embodiment of this application.

S701. The receive end controller receives a target impedance sent by a transmit end controller.

S702. The receive end controller obtains a corresponding target input impedance of a rectifier based on the target impedance.

After obtaining the target input impedance of the rectifier, the receive end controller needs to first determine whether the target input impedance is within an adjustable impedance range of a receive end, and if the target input impedance is not within the adjustable impedance range of the receive end, waits for the transmit end controller to send a new target impedance. If the target input impedance is within the adjustable impedance range of the receive end, S704 is performed.

S703. The receive end controller obtains an equivalent input impedance of the rectifier.

Further, the receive end controller obtains the equivalent input impedance of the rectifier based on an input current and a bridge arm voltage of the rectifier, that is, the bridge arm voltage divided by the input current is the equivalent input impedance of the rectifier.

S704. Compare a capacitivity value of the target input impedance and that of the equivalent input impedance of the rectifier.

S705. Decrease a phase difference between the input current and the bridge arm voltage of the rectifier when the equivalent input impedance of the rectifier exhibits a capacitivity greater than that of the target input impedance, and increase the phase difference between the input current and the bridge arm voltage of the rectifier when the equivalent input impedance of the rectifier exhibits a capacitivity less than or equal to that of the target input impedance.

That the equivalent input impedance of the rectifier exhibits a capacitivity greater than that of the target impedance includes an imaginary part of the equivalent input impedance of the rectifier is a negative value, an imaginary part of the target impedance is a negative value, and an absolute value of the imaginary part of the equivalent input impedance of the rectifier is greater than an absolute value of the imaginary part of the target impedance.

For example, Z2 is used to represent the equivalent input impedance of the rectifier, $Z2=R2+jIm2$, where R2 represents a real part, represents a resistive part, and a current flowing through the R2 is in phase with a voltage across both ends of the R2. Im2 is an imaginary part, and represents a capacitive part or an inductive part. When $Im2>0$, it indicates that the imaginary part is positive and is an inductive impedance, and in this case, a phase of a current on the Im2 lags behind a phase of a voltage on the Im2 by 90 degrees. When $Im2<0$, it indicates that the imaginary part is negative and is a capacitive impedance, and in this case, a phase of a current on the Im2 is ahead of a phase of a voltage on the Im2 by 90 degrees. A large capacitivity means that an absolute value of Im2 is relatively large.

The phase difference between the input current and the bridge arm voltage of the rectifier is adjusted so that a reflection impedance of the receive end is consistent with the target impedance.

In this embodiment, the receive end adjusts the capacitivity value of the equivalent input impedance of the rectifier by adjusting the phase difference between the input current and the bridge arm voltage of the rectifier. Because a capacitivity of the equivalent input impedance of the rectifier may be adjusted to adjust a value of the reflection impedance reflected from the receive end to a transmit end such that the reflection impedance actually reflected from the receive end to the transmit end is consistent with a reflection impedance required by the transmit end, and therefore, it is possible to ensure that an inverter of the transmit end implements ZVS. In this embodiment, the ZVS of the inverter is implemented by adjusting the reflection impedance of the receive end, that is, the rectifier is considered as a load with a variable impedance, and an impedance of the inverter itself does not need to be adjusted.

The receive end controller is further configured to obtain the target input impedance of the rectifier based on the target impedance, a modulus value of an impedance of each branch in the receive end LCC compensation network, and a mutual inductance between a transmit coil and a receive coil.

A process in which the receive end controller obtains the target input impedance is described below with reference to the accompanying drawings.

Figure 8A:
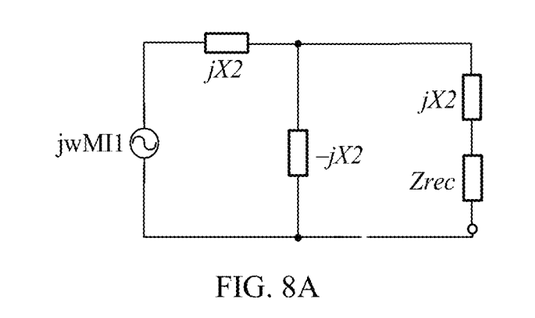
FIG. 8A is an equivalent circuit diagram of a receive end according to an embodiment of this application.

FIG. 8A is an equivalent circuit diagram of a receive end according to an embodiment of this application.

FIG. 8A is an equivalent circuit corresponding to a receive end LCC compensation network. A target impedance Zr includes a real part Rzr and an imaginary part Xzr, as shown in the following formula. A target input impedance Zrec of a rectifier may be obtained using the following formula:

$$Z_r = R_{Zr} + j * X_{Zr}; \text{ and}$$

$$Z_{rec} = \frac{X2^2}{(\omega M)^2} * Zr,$$

where X2 is a modulus value of an impedance of each branch in the receive end LCC compensation network and the modulus value means an absolute value of the impedance. M is a mutual inductance between a transmit coil and a receive coil.

Based on the receive end of the wireless charging system provided in the foregoing embodiment, an embodiment of this application further provides a transmit end of a wireless charging system, which is described in detail below with reference to the accompanying drawings.

Figure 8B:
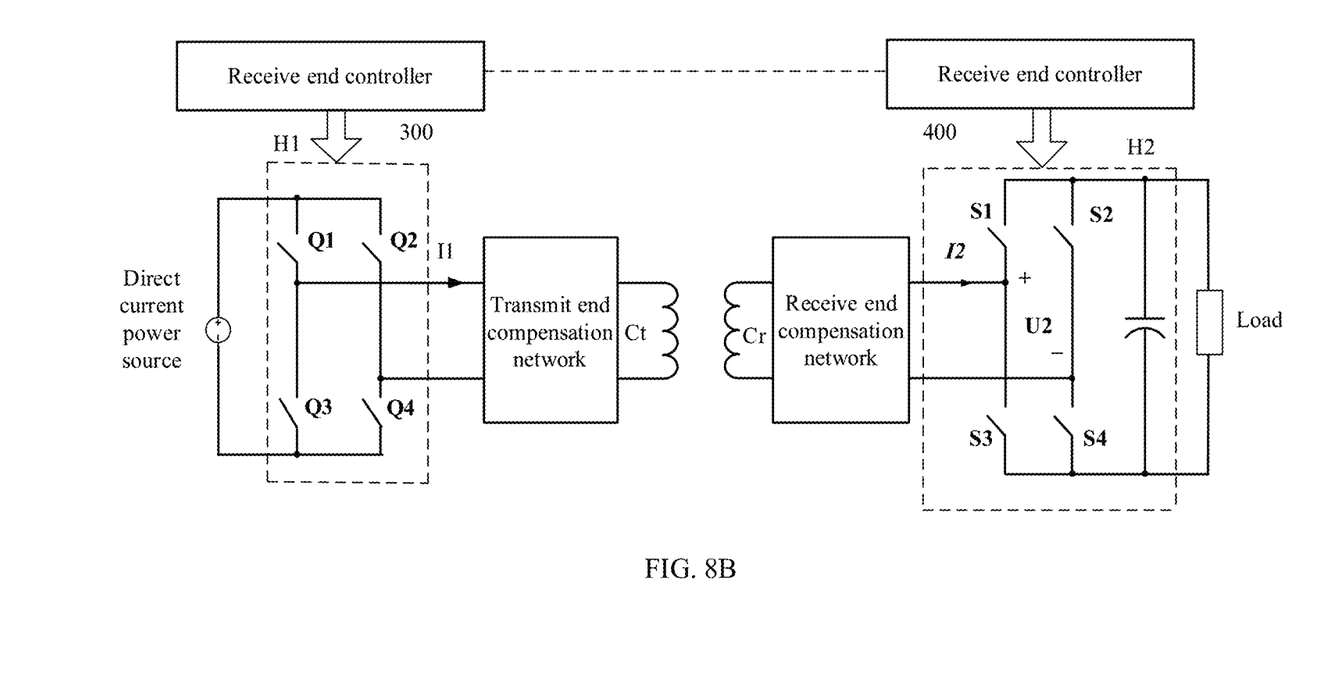
FIG. 8B is a schematic diagram of a transmit end in a wireless charging system according to an embodiment of this application.

First Embodiment of a Transmit End:

FIG. 8B is a schematic diagram of a transmit end in a wireless charging system according to an embodiment of this application.

The transmit end of the wireless charging system provided in this embodiment includes a transmit coil Ct, an inverter H1, and a transmit end controller 300.

The inverter H1 is configured to invert a direct current output by a direct current power source into an alternating current. It may be understood that when the field of application of the wireless charging system is an electric vehicle, the transmit end is provided on ground, the receive end is provided on the electric vehicle, and the transmit end and the receive end wirelessly communicate with each other. In addition, charging is performed wirelessly, and further, energy is transferred using an alternating magnetic field.

The transmit coil Ct is configured to transmit the alternating current in a form of an alternating magnetic field.

The transmit end controller 300 is configured to obtain a target impedance based on an input voltage of the inverter H1, a phase difference between two bridge arms of the inverter H1, and a power that the wireless charging system needs to output, and send the target impedance to the receive end controller 400 such that the receive end controller 400 controls a reflection impedance of the receive end to be consistent with the target impedance.

Two bridge arms of the H1 are bridge arms respectively formed by Q1 and Q3, and bridge arms respectively formed by Q2 and Q4.

Figure 9:
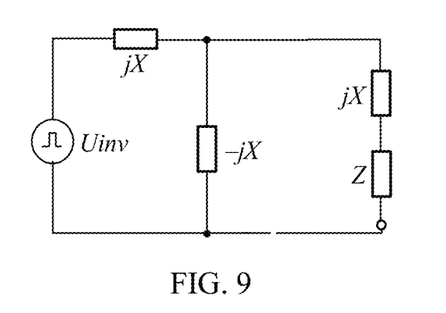
FIG. 9 is an equivalent circuit diagram of a transmit end according to an embodiment of this application.

An input voltage of the H1 means an output voltage of a direct current power source, and a method for obtaining the target impedance is described below with reference to an equivalent circuit diagram of the transmit end.

FIG. 9 is an equivalent circuit diagram of a transmit end according to an embodiment of this application.

Uinv represents a direct current power source and Ubus represents a voltage of Uinv.

A transmit end controller 300 obtains a target impedance based on Ubus and a phase difference between two bridge arms of the H1, and a power Po that a receive end needs to output, which may be obtained using the following formula.

A real part Rzr of the target impedance is Formula (1):

$$R_{Zr} = \frac{P_o * X^2}{\left(\frac{2\sqrt{2}}{\pi} * U_{bus} * \sin\left(\frac{\theta}{2}\right)\right)^2}. \qquad (1)$$

An imaginary part Xzr of the target impedance is Formula (2):

$$X_{Zr} = \frac{P_o * X^2 * \tan\frac{\pi - \theta}{2}}{\left(\frac{2\sqrt{2}}{\pi} * U_{bus} * \sin\left(\frac{\theta}{2}\right)\right)^2}. \qquad (2)$$

Po is a power that a wireless charging system needs to output, for example, when applied to the field of electric vehicles, a value of Po is determined by a battery of an electric vehicle.

It may be understood that the transmit end controller 300 obtains a target impedance of a reflection impedance according to Formula (1) and Formula (2), that is, a value of a reflection impedance that needs to be reflected by the receive end. However, in actual operation, usually, the target impedance cannot be reached by adjusting the reflection impedance at one time. Therefore, the transmit end controller 300 is further configured to obtain the reflection impedance of the receive end based on an output voltage and an output current of the transmit end, compare the reflection impedance of the receive end with the target impedance, and if the reflection impedance of the receive end is consistent with the target impedance, send, to the receive end controller 400, a message to end adjustment of a phase difference between the input current and the bridge arm voltage of the rectifier.

A manner in which the transmit end controller 300 obtains an actual reflection impedance is described below with reference to FIG. 9.

An equivalent circuit diagram shown in FIG. 9 includes three impedance branches: a first branch including jX, a second branch including −jX, and a third branch including jX and a reflection impedance Z. The three branches of a transmit end LCC compensation network include equal modulus values of impedances, that is, an impedance of each branch is X.

The transmit end controller 300 obtains the value of the reflection impedance based on a voltage and a current of the third branch.

Figure 10:
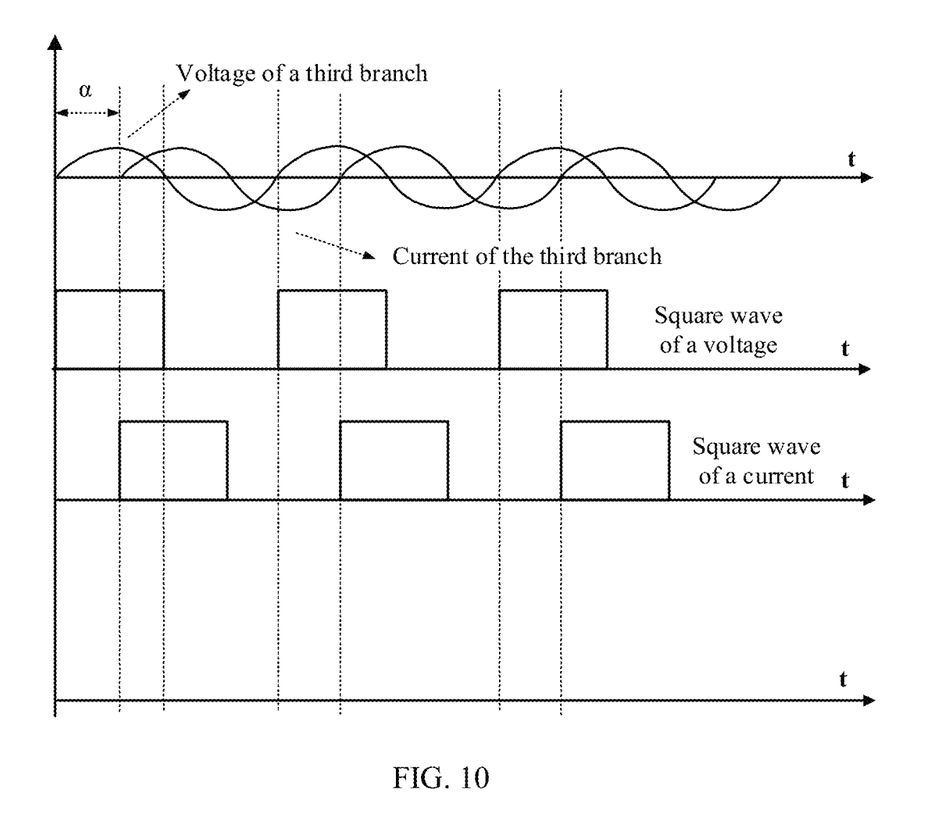
FIG. 10 is a waveform diagram of a voltage and a current of a third branch corresponding to FIG. 9.

FIG. 10 is a waveform diagram of a voltage and a current of a third branch corresponding to FIG. 9.

The voltage of the third branch is ahead of the current of the third branch by a phase a. That is, a phase difference between the voltage and the current of the third branch is a.

Then, a real part of a reflection impedance Z=(a voltage peak of a transmit coil/a current peak of the transmit coil)*cos α.

An imaginary part of the reflection impedance Z=(a voltage peak of the transmit coil/a current peak of the transmit coil)*sin α−X.

It may be understood that the real part and the imaginary part of the target impedance Zr are calculated in Formula (1) and Formula (2), while the real part and the imaginary part of Z are a real part and an imaginary part of the actual reflection impedance. The transmit end controller 300 may determine, based on the real part and the imaginary part of the actual reflection impedance, whether the receive end needs to continue adjusting a phase difference between a bridge arm voltage and an input current of the rectifier. When the real part and the imaginary part of the actual reflection impedance are respectively consistent with the real part and the imaginary part of the target impedance, it is not necessary to continue adjusting the phase difference between the bridge arm voltage and the input current of the rectifier.

Embodiment of a Wireless Charging System:

Based on the receive end and the transmit end of the wireless charging system provided in the foregoing embodiments, an embodiment of this application further provides a wireless charging system, and the wireless charging system includes the transmit end and the receive end described in the foregoing embodiments. The wireless charging system further includes a power battery string.

The receive end charges the power battery string.

When the wireless charging system is applied to the field of electric vehicles, the receive end is located on an electric vehicle, and the receive end charges a power battery string of the electric vehicle, that is, the power battery string supplies energy to the electric vehicle is supplying power by a motor on the electric vehicle, and the motor supplies a driving force to the electric vehicle.

Because the transmit end included in the wireless charging system may implement ZVS of the inverter, thereby reducing a loss generated by a controllable switching transistor of the inverter in an operation process, and further improving electric energy transmission efficiency of a transmit coil and a receive coil.

To intuitively understand the beneficial effects of the technical solutions provided in the embodiments of this application, the following is described in detail with reference to an experimental simulation waveform diagram.

Figure 11:
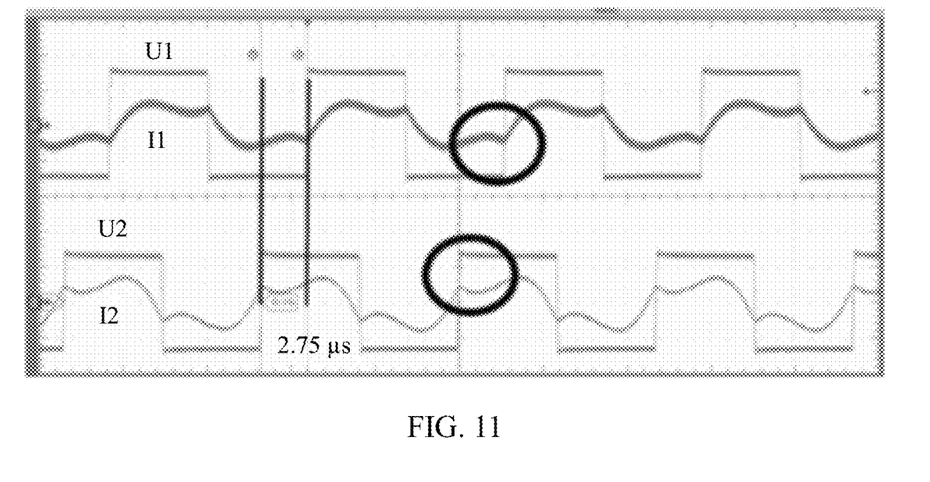
FIG. 11 is a waveform diagram corresponding to a difference of 2.75 microseconds (μs) between a bridge arm voltage U1 of an inverter and a bridge arm voltage U2 of a rectifier according to an embodiment of this application.

FIG. 11 is a waveform diagram corresponding to a difference of 2.75 μs between a bridge arm voltage U1 of an inverter and a bridge arm voltage U2 of a rectifier according to an embodiment of this application.

Figure 12:
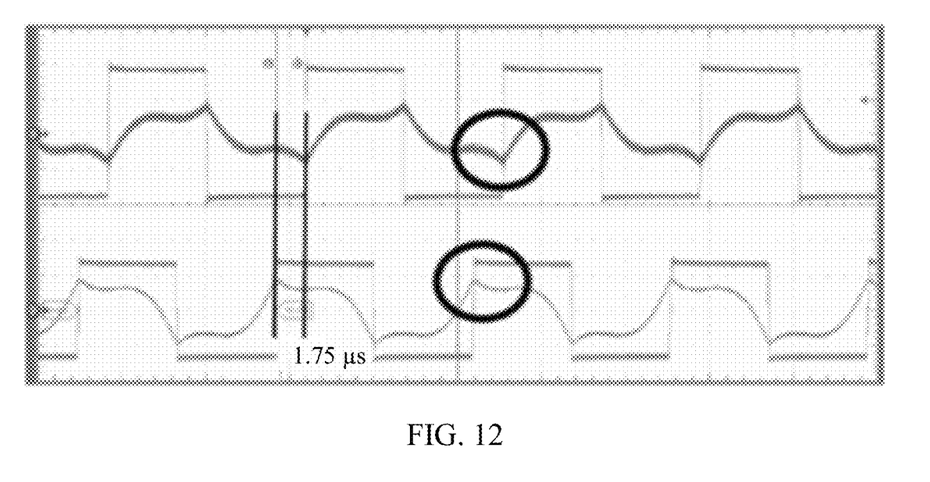
FIG. 12 is a waveform diagram corresponding to a difference of 1.75 μs between a bridge arm voltage U1 of an inverter and a bridge arm voltage U2 of a rectifier according to an embodiment of this application.

FIG. 12 is a waveform diagram corresponding to a difference of 1.75 us between a bridge arm voltage U1 of an inverter and a bridge arm voltage U2 of a rectifier according to an embodiment of this application.

It may be understood that a phase of U2 is ahead of a phase of U1.

By comparing FIG. 11 and FIG. 12, it may be learned that because an angle by which the bridge arm voltage of the rectifier is ahead of is decreased, that is, from 2.75 μs to 1.75 μs. It may be learned that a negative current of an I1 current line marked by a circle is increased, and that a larger negative current makes it easier to implement ZVS. Therefore, it is more advantageous for a controllable switching transistor of an inverter of a transmit end to implement ZVS.

It may be learned that a relatively large equivalent impedance capacitivity on a receive side (for example, a positive current of I2 in a case of 1.75 μs is greater than a positive current of I2 in a case of 2.75 μs) leads to a relatively large equivalent impedance inductivity of the transmit end (for example, a negative current of I1 in a case of 2.75 μs is less than a negative current of I1 in a case of 1.75 μs), and in this case, turn-on losses of the inverter and the rectifier are increased. Therefore, an angle by which the receive side is ahead of may be appropriately increased to decrease a reactive current, thereby achieving a smaller turn-on loss. Because the turn-on loss is directly proportional to the square of a current, the reactive current decreases, and a current on the controllable switching transistor decreases.

It should be understood that "at least one" in this application means one or more, and "a plurality of" means two or more. "and/or" is used to describe an association relationship between associated objects and represents that three relationships may exist. For example, "A and/or B" may represent the following three cases: only A exists, only B exists, and both A and B exist, where A and B each may be singular or plural. The character "l" generally indicates an "or" relationship between the associated objects. "at least one of the following" or similar expressions thereof mean any combination of these, including a single one or any combination of plural items. For example, at least one of a, b, or c may represent a, b, c, "a and b", "a and c", "b and c", or "a, b, and c", where a, b, c may be a single one or a plurality of.

The foregoing descriptions are merely embodiments of the present disclosure, but are not intended to limit the present disclosure in any form. Although the present disclosure has been disclosed in the preferred embodiments above, it is not intended to limit the present disclosure. Using the method and the technical content disclosed above, any person of ordinary skill in the art can make a plurality of possible changes and modifications on the technical solutions of the present disclosure, or amend the technical solutions thereof to be embodiments with equal effects through equivalent variations without departing from the protection scope of the technical solutions of the present disclosure. Therefore, any simple amending, equivalent change, and modification, made to the foregoing embodiments without departing from the content of the technical solutions of the present disclosure and based on the technical essence of the present disclosure shall fall within the protection scope of the technical solutions of the present disclosure.

What is claimed is:

1. A receive end of a wireless charging system comprising:
   a receive coil configured to:
      receive an alternating magnetic field; and
      output an alternating current;
   a rectifier coupled to the receive coil and configured to rectify the alternating current into a direct current, wherein a bridge arm voltage of the rectifier is:
      a first voltage between two bridge arm midpoints of the rectifier when the rectifier is a full bridge rectifier; and
      a second voltage between a single bridge arm midpoint of the rectifier and a ground when the rectifier is a half bridge rectifier; and
   a receive end controller configured to:
      receive a target impedance from a transmit end controller; and
      adjust, based on the target impedance, a reflection impedance reflected from the receive end to a transmit end to enable an inverter of the transmit end to implement a zero voltage switching (ZVS).

2. The receive end of claim 1, wherein the receive end controller is further configured to:
   obtain a target input impedance of the rectifier based on the target impedance;
   obtain an equivalent input impedance of the rectifier;
   compare the target input impedance with the equivalent input impedance; and
   adjust, based on a comparison between the target input impedance with the equivalent input impedance, a phase difference between an input current of the rectifier and the bridge arm voltage to match the reflection impedance with the target impedance.

3. The receive end of claim 2, wherein the receive end controller is further configured to:
   compare the equivalent input impedance with the target input impedance; and
   increase the phase difference when a first capacitivity of the equivalent input impedance is less than or equal to a second capacitivity of the target input impedance.

4. The receive end of claim 2, wherein the receive end controller is further configured to:
   compare the equivalent input impedance with the target input impedance; and
   decrease the phase difference when a first capacitivity of the equivalent input impedance is greater than a second capacitivity of the target input impedance.

5. The receive end of claim 4, wherein the receive end controller is further configured to identify that the first capacitivity is greater than the second capacitivity when the following conditions are met:
   a first imaginary part of the equivalent input impedance is a first negative value;
   a second imaginary part of the target impedance is a second negative value; and
   a first absolute value of the first imaginary part is greater than a second absolute value of the second imaginary part.

6. The receive end of claim 2, further comprising a receive end inductor-capacitor-capacitor (LCC) compensation network coupled between the receive coil and the rectifier and configured to:
   compensate the alternating current to obtain a compensated alternating current; and
   send the compensated alternating current to the rectifier.

7. The receive end of claim 6, wherein the receive end controller is further configured to obtain the target input impedance based on the target impedance, a modulus value of an impedance of each branch in the receive end LCC compensation network, and a mutual inductance between a transmit coil and the receive coil.

8. The receive end of claim 2, wherein the receive end controller is further configured to obtain the equivalent input impedance based on the input current and the bridge arm voltage.

9. A transmit end of a wireless charging system comprising:
   an inverter comprising two bridge arms, wherein the inverter is configured to invert a direct current from a direct current power source into an alternating current;
   a transmit coil coupled to the inverter and configured to transmit the alternating current in a form of an alternating magnetic field; and
   a transmit end controller configured to:
      obtain a target impedance based on an input voltage of the inverter, a first phase difference between the two bridge arms, and an output power of the wireless charging system; and
      send the target impedance to a receive end controller to enable the receive end controller to control a reflection impedance of a receive end to match the target impedance.

10. The transmit end of claim 9, wherein the transmit end controller is further configured to:
   obtain the reflection impedance based on an output voltage and an output current of the transmit end;
   compare the reflection impedance with the target impedance; and
   send, to the receive end controller, a message to end adjustment of a second phase difference between an input current of a rectifier and a bridge arm voltage of the rectifier when the reflection impedance matches the target impedance.

11. A wireless charging system comprising:
   a power battery string; and
   a transmit end comprising:
      an inverter comprising two bridge arms, wherein the inverter is configured to invert a first direct current from a direct current power source into a first alternating current;
      a transmit coil coupled to the inverter and configured to transmit the alternating current in a form of an alternating magnetic field; and
      a transmit end controller configured to:
         obtain a target impedance based on an input voltage of the inverter, a first phase difference between the two bridge arms, and an output power of the wireless charging system; and
         send the target impedance; and
   a receive end coupled to the power battery string and the transmit end and comprising:
      a receive coil configured to:
         receive the alternating magnetic field; and
         output a second alternating current;
      a rectifier coupled to the receive coil and configured to rectify the second alternating current into a second direct current, wherein a bridge arm voltage of the rectifier is:
         a first voltage between two bridge arm midpoints of the rectifier when the rectifier is a full bridge rectifier; and a second voltage between a single bridge arm midpoint of the rectifier and a ground when the rectifier is a half bridge rectifier; and a receive end controller configured to:
receive the target impedance from the transmit end controller; and
adjust, based on the target impedance, a reflection impedance reflected from the receive end to the transmit end to enable the inverter to implement a zero voltage switching (ZVS), wherein the receive end is configured to charge the power battery string.

12. The wireless charging system of claim 11, wherein the receive end controller is further configured to:
obtain a target input impedance of the rectifier based on the target impedance;
obtain an equivalent input impedance of the rectifier;
compare the target input impedance with the equivalent input impedance; and
adjust, based on a comparison result between the target input impedance with the equivalent input impedance, a second phase difference between an input current of the rectifier and the bridge arm voltage to match the reflection impedance with the target impedance.

13. The wireless charging system of claim 12, wherein the receive end controller is further configured to:
compare the equivalent input impedance with the target input impedance; and
increase the second phase difference when a first capacitivity of the equivalent input impedance is less than or equal to a second capacitivity of the target input impedance.

14. The wireless charging system of claim 12, wherein the receive end controller is further configured to:
compare the equivalent input impedance with the target input impedance; and
decrease the second phase difference when a first capacitivity of the equivalent input impedance is greater than a second capacitivity of the target input impedance.

15. The wireless charging system of claim 14, wherein the receive end controller is further configured to identify that the first capacitivity is greater than the second capacitivity when the following conditions are met:
a first imaginary part of the equivalent input impedance is a first negative value;
a second imaginary part of the target impedance is a second negative value; and
a first absolute value of the first imaginary part is greater than a second absolute value of the second imaginary part.

16. The wireless charging system of claim 12, wherein the receive end further comprises a receive end inductor-capacitor-capacitor (LCC) compensation network coupled between the receive coil and the rectifier and configured to:
compensate the second alternating current to obtain a compensated alternating current; and
send the compensated alternating current to the rectifier.

17. The wireless charging system of claim 16, wherein the receive end controller is further configured to obtain the target input impedance based on the target impedance, a modulus value of an impedance of each branch in the receive end LCC compensation network, and a mutual inductance between the transmit coil and the receive coil.

18. The wireless charging system of claim 12, wherein the receive end controller is further configured to obtain the equivalent input impedance based on the input current and the bridge arm voltage.

19. The wireless charging system of claim 11, wherein the transmit end controller is further configured to:
obtain the reflection impedance based on an output voltage and an output current of the transmit end; and
compare the reflection impedance with the target impedance.

20. The wireless charging system of claim 19, wherein the transmit end controller is further configured to send, to the receive end controller, a message to end adjustment of a second phase difference between an input current of the rectifier and the bridge arm voltage when the reflection impedance matches the target impedance.

* * * * *